United States Patent
Shiratori

(10) Patent No.: US 10,150,693 B2
(45) Date of Patent: Dec. 11, 2018

(54) NEAR INFRARED CUTOFF FILTER GLASS

(71) Applicant: Asahi Glass Company, Limited, Chiyoda-ku (JP)

(72) Inventor: Makoto Shiratori, Haibara-gun (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 15/671,863

(22) Filed: Aug. 8, 2017

(65) Prior Publication Data

US 2017/0334766 A1 Nov. 23, 2017

Related U.S. Application Data

(63) Continuation of application No. PCT/JP2016/057621, filed on Mar. 10, 2016.

(30) Foreign Application Priority Data

Mar. 24, 2015 (JP) .................. 2015-060760

(51) Int. Cl.
C03C 3/247 (2006.01)
C03C 4/08 (2006.01)
G02B 5/22 (2006.01)
G02B 5/20 (2006.01)

(52) U.S. Cl.
CPC ........... *C03C 3/247* (2013.01); *C03C 4/08* (2013.01); *C03C 4/082* (2013.01); *G02B 5/208* (2013.01); *G02B 5/22* (2013.01); *G02B 5/226* (2013.01); *C03C 2204/00* (2013.01)

(58) Field of Classification Search
CPC ........... C03C 3/247; C03C 4/08; C03C 4/082; C03C 2204/00
See application file for complete search history.

(56) References Cited

U.S. PATENT DOCUMENTS

| | | | |
|---|---|---|---|
| 4,297,142 A | 10/1981 | Ritze | |
| 4,615,989 A | 10/1986 | Ritze | |
| 5,173,212 A | 12/1992 | Speit et al. | |
| 5,242,868 A * | 9/1993 | Hara | ........ C03C 3/247 501/44 |
| 5,750,448 A | 5/1998 | Grabowski et al. | |
| 2004/0082460 A1 * | 4/2004 | Yamane | ........ C03C 3/16 501/48 |

FOREIGN PATENT DOCUMENTS

| | | | | |
|---|---|---|---|---|
| JP | 56-9242 | | 1/1981 | |
| JP | 60-235740 | | 11/1985 | |
| JP | 1-219037 | | 9/1989 | |
| JP | 2-204342 | | 8/1990 | |
| JP | 02204342 A | * | 8/1990 | ........ C03C 3/247 |
| JP | 6-107428 | | 4/1994 | |
| JP | 9-202644 | | 8/1997 | |
| JP | 2004-83290 | | 3/2004 | |
| JP | 2004-137100 | | 5/2004 | |
| JP | 2008-1544 | | 1/2008 | |
| JP | 2009-263190 | | 11/2009 | |
| JP | 2011132077 A | * | 7/2011 | |
| JP | 2014101255 A | * | 6/2014 | |

OTHER PUBLICATIONS

International Search Report dated May 10, 2016 in PCT/JP2016/057621, filed Mar. 10, 2016.

\* cited by examiner

*Primary Examiner* — Elizabeth A. Bolden
(74) *Attorney, Agent, or Firm* — Oblon, McClelland, Maier & Neustadt, L.L.P.

(57) ABSTRACT

To provide a near infrared cutoff filter glass which is excellent in optical properties such that the transmittance of light in the visible range is high and the transmittance of near infrared light is low. A near infrared cutoff filter glass comprising P, F, O, Cu and Ce, wherein by cation %, from 0.1 to 15% of $Cu^{2+}$ is contained, and the ratio of $Cu^{2+}$ to $Ce^{4+}$ ($Cu^{2+}/Ce^{4+}$) is from 3.5 to 15.

19 Claims, No Drawings

NEAR INFRARED CUTOFF FILTER GLASS

TECHNICAL FIELD

The present invention relates to a near infrared cutoff filter glass which is used for a color calibration filter of e.g. a digital still camera or a color video camera, which is particularly excellent in transmittance of light in the visible region.

BACKGROUND ART

A solid state imaging sensor such as CCD or CMOS to be used for e.g. a digital still camera has a spectral sensitivity covering from the visible region to the near infrared region in the vicinity of 1,200 nm. Accordingly, since no good color reproducibility will be obtained as it is, the luminosity factor is corrected by using a near infrared cutoff filter glass having a specific substance which absorbs infrared rays added. As such a near infrared cutoff filter glass, in order to selectively absorb wavelengths in the near infrared region and to achieve a high weather resistance, an optical glass having CuO added to fluorophosphate glass, has been developed and used. As such glass, the compositions are disclosed in Patent Documents 1 to 4.

PRIOR ART DOCUMENTS

Patent Documents

Patent Document 1: JP-A-1-219037
Patent Document 2: JP-A-2004-83290
Patent Document 3: JP-A-2004-137100
Patent Document 4: JP-A-2008-1544

DISCLOSURE OF INVENTION

Technical Problem

Cameras, etc. using solid state imaging sensors are being miniaturized and thinned. Being accompanied with it, it is desired to miniaturize and thin imaging devices and their mounted devices similarly. In a case where a near infrared cutoff filter glass having CuO added to fluorophosphate glass is to be made thin, it is necessary to increase the concentration of Cu component which influences the optical properties. However, if the concentration of Cu component in glass is increased, although the optical properties in the near infrared region would be as desired, the transmittance of light in the visible region deteriorates, such being problematic.

Here, in Patent Document 4, Ce is incorporated in order to improve the transmittance in the visible region. However, merely by incorporating Ce, there have been cases where the transmittance of the visible region decreases.

It is an object of the present invention to provide a near infrared cutoff filter glass which is excellent in optical properties such that even though the concentration of Cu component in glass becomes high in order to make the glass to be thin, the transmittance of light in the visible region is high, and the transmittance of light in the near infrared region is low.

Solution to Problem

As a result of extensive studies, the present inventors have found that by incorporating Ce component in glass and strictly controlling the ratio of Cu ions to Ce ions ($Cu^{2+}/Ce^{4+}$), it is possible to obtain a near infrared cutoff filter glass having excellent optical properties which have not been attained heretofore.

The near-infrared cutoff filter glass of the present is a near infrared cutoff filter glass comprising P, F, O, Cu and Ce, wherein by cation %, from 0.1 to 15% of $Cu^{2+}$ is contained, and the ratio of $Cu^{2+}$ to $Ce^{4+}$ ($Cu^{2+}/Ce^{4+}$) is from 3.5 to 15.

Here, in this specification, "to" indicating a numerical range is used in the sense of including the numerical values described before and after it as the lower limit value and the upper limit value, and unless otherwise specified, hereinafter in this specification, "to" is used in the same sense.

Further, the near infrared cutoff filter glass of the present invention, is preferably a near infrared cutoff filter glass comprising P, F, O, Cu, Ce, Al, R (wherein R is at least one alkali metal selected from Li, Na and K,) and R' (wherein R' is at least one alkaline each metal selected from Mg, Ca, Sr, Ba and Zn), wherein by cation %, from 0.1 to 15% of $Cu^{2+}$ is contained, and the ratio of $Cu^{2+}$ to $Ce^{4+}$ ($Cu^{2+}/Ce^{4+}$) is from 3.5 to 15.

Further, it is preferred that by cation %, from 0.01 to 4% of $Ce^{4+}$ is contained.

Further, the near infrared cutoff filter glass of the present invention preferably comprises, as represented by cation %,
$P^{5+}$: from 30 to 50%,
$Al^{3+}$: from 5 to 20%,
$R^+$: from 20 to 40% (wherein $R^+$ is the total amount of $Li^+$, $Na^+$ and $K^+$),
$R'^{2+}$: 5 to 30% (wherein $R'^{2+}$ is the total amount of $Mg^{2+}$, $Ca^{2+}$, $Sr^{2+}$, $Ba^{2+}$ and $Zn^{2+}$)
$Cu^{2+}$: from 0.1 to 15%,
$Sb^{3+}$: from 0 to 1%, and
$Ce^{4+}$: from 0.01 to 4%,
and as represented by anion %,
$O^{2-}$: from 30 to 90%, and
$F^-$: from 10 to 70%.

Further, the near infrared cutoff filter glass of the present invention preferably comprises, as represented by cation %,
$P^{5+}$: from 30 to 50%,
$Al^{3+}$: from 5 to 20%,
$R^+$: from 20 to 40% (wherein $R^+$ is the total amount of $Li^+$, $Na^+$ and $K^+$),
$R'^{2+}$: from 5 to less than 12% (wherein $R'^{2+}$ is the total amount of $Mg^{2+}$, $Ca^{2+}$, $Sr^{2+}$, $Ba^{2+}$ and $Zn^{2+}$),
$Cu^{2+}$: from 0.1 to 15%,
$Sb^{3+}$: from 0 to 1%, and
$Ce^{4+}$: from 0.01 to 4%,
and as represented by anion %,
$O^{2-}$: from 30 to 90%, and
$F^-$: from 10% to 70%.

Further, the near infrared cutoff filter glass of the present invention is preferably such that the numerical value obtained by dividing the absorption coefficient at a wavelength of 400 nm by the absorption coefficient at a wavelength of 800 nm is in a range of from 0.00001 to 0.03.

Advantageous Effects of Invention

According to the present invention, it is possible to obtain a near-infrared cutoff filter glass excellent in optical properties such that the transmittance of light in the visible region is high, and the transmittance of light in the near-infrared region is low.

DESCRIPTION OF EMBODIMENTS

The near-infrared cutoff filter glass of the present invention (hereinafter sometimes referred to as the glass of the present invention), is a glass comprising components of at least P, F, O, Cu and Ce, wherein by cation %, from 0.1 to 15% of $Cu^{2+}$ is contained, and the ratio of $Cu^{2+}$ to $Ce^{4+}$ ($Cu^{2+}/Ce^{4+}$) is from 3.5 to 15.

$Cu^{2+}$ is an essential component for cutting off near infrared rays, and if it is less than 0.1%, its effect cannot be sufficiently obtained when the thickness of the glass is made thin, and if it exceeds 15%, the transmittance in the visible region decreases, such being undesirable. It is preferably from 0.1 to 12%, more preferably from 0.2 to 10%, further preferably from 0.4 to 9%.

By adjusting the ratio of the $Cu^{2+}$ content to the $Ce^{4+}$ content ($Cu^{2+}/Ce^{4+}$), it is possible to obtain a near infrared cutoff filter glass having a preferred visible region transmittance. If ($Cu^{2+}/Ce^{4+}$) is less than 3.5, $Ce^{4+}$ becomes excessive, and absorption by $Ce^{4+}$ appears, whereby the transmittance in the vicinity of a wavelength of 400 nm tends to be low. Further, if ($Cu^{2+}/Ce^{4+}$) exceeds 15, the amount of $Ce^{4+}$ becomes small whereby the effect of improving the transmittance becomes small. It is preferably from 5 to 14, more preferably from 6 to 14.

$Ce^{4+}$ is an essential component for improving the transmittance. $Ce^{4+}$ is higher in redox potential and lower in ionization tendency than $Cu^{2+}$. When both elements coexist, $Cu^{2+}$ having higher ionization tendency is liable to be oxidized, and has an effect to suppress formation of Cu' which lowers the transmittance near a wavelength of 400 nm. By cation %, $Ce^{4+}$ is preferably contained in an amount of from 0.01 to 4%. If it is less than 0.01%, the Ce amount is too small, whereby it is impossible to obtain the desired effect. On the other hand, if it exceeds 4%, the absorption in the ultraviolet region by Ce component is applied to the visible region, whereby the transmittance in the vicinity of a wavelength of 400 nm tends to be lowered. It is more preferably from 0.01 to 3%, further preferably from 0.05 to 3%, particularly preferably from 0.08 to 2.5%, most preferably from 0.1 to 2%.

The glass of the present invention is preferably such that the numerical value obtained by dividing the absorption coefficient at a wavelength of 400 nm by the absorption coefficient at a wavelength of 800 nm is preferably in a range of from 0.00001 to 0.03.

An absorption coefficient is a constant which indicates, when light enters a medium, how much light will be absorbed by the medium and which has a dimension with the reciprocal of length. According to the Lambert-Beer law, the logarithm (absorbance) of the ratio of the intensity of light passed through a medium for a certain distance to the intensity of incident light is in proportion to the passing distance, and such a proportionality coefficient will be referred to as an absorption coefficient. That is, when the absorption coefficient is high, the amount of light transmitted through the glass is small, and when the absorption coefficient is low, the amount of light transmitted through the glass is large.

Light with a wavelength of 400 nm is correlated with the content of $Cu^+$ in the glass, such that the absorption coefficient becomes higher as the content increases. Further, light with a wavelength of 800 nm is correlated with the content of $Cu^{2+}$ in the glass, such that the absorption coefficient becomes higher as the content increases. Therefore, as the near-infrared cutoff filter glass, it is preferred that the absorption coefficient at a wavelength of 400 nm is low, and the absorption coefficient at a wavelength of 800 nm is high. However, by the content of the Cu component in the glass, the absolute value of the absorption coefficient changes. Therefore, by adjusting the numerical value obtained by dividing the absorption coefficient at a wavelength of 400 nm by the absorption coefficient at a wavelength of 800 nm to be in the range of from 0.00001 to 0.03, it is possible to obtain a near-infrared cutoff filter glass good in balance of transmission characteristics of lights in the visible region and the near infrared region regardless of the content of the Cu component in the glass.

If the numerical value obtained by dividing the absorption coefficient at a wavelength of 400 nm by the absorption coefficient at a wavelength of 800 nm exceeds 0.03, the transmittance in the vicinity of a wavelength of 400 nm tends to be low, such being undesirable. If it is less than 0.00001, it becomes necessary to strictly control the atmosphere in the molten glass in order to reduce the content of $Cu^+$, whereby the production cost is likely to be high. The numerical value obtained by dividing the absorption coefficient at a wavelength of 400 nm by the absorption coefficient at a wavelength of 800 nm is preferably from 0.00002 to 0.025, more preferably from 0.00003 to 0.02.

The method for calculating the absorption coefficient in the present invention is as follows. Both surfaces of a glass plate are mirror-polished, and the thickness t is measured. The spectral transmittance T of this glass plate is measured (e.g. by using an ultraviolet-visible near-infrared spectrophotometer V-570, manufactured by JASCO Corporation). Then, the absorption coefficient β is calculated by using the relational formula $T=10^{-\beta t}$. Here, in order to remove a reflection loss, the absorption coefficient was calculated by using as $T_{i1}$ a numerical value obtained by multiplying the measured transmittance by the theoretical transmittance calculated from the refractive index of the glass.

The value of the transmittance was converted so as to be a value in a thickness of 0.3 mm. The conversion for the thickness was carried out by using the following formula. Here, $T_{i1}$ is the transmittance of the measured sample excluding the reflection loss, $t_1$ is the thickness of the measured sample, $T_{i2}$ is the transmittance as the converted value, and $t_2$ is the thickness for conversion (0.3 in the case of the present invention).

$$T_{i2} = T_{i1}^{\frac{t_2}{t_1}}$$

The glass of the present invention is preferably such that in the spectral transmittance converted in a thickness of 0.3 mm, the transmittance at a wavelength of 400 nm is from 77 to 92%, whereby it is possible to obtain a glass having high transmittance of light in the visible region.

In the spectral transmittance converted in a thickness 0.3 mm, if the transmittance at a wavelength of 400 nm is less than 77%, the transmittance near a wavelength of 400 nm is too low, and an influence tends to appear in the color tone when used in an imaging apparatus, such being undesirable. On the other hand, if it exceeds 92%, it is required to strictly control the atmosphere in the molten glass in order to reduce the content of $Cu^+$, whereby the production cost tends to be high. In the spectral transmittance converted in a thickness of 0.3 mm, the transmittance at a wavelength of 400 nm is more preferably from 78 to 91.5%, further preferably from 80 to 91%.

Reasons for limiting the contents of the respective components (represented by cation % and anion %) constituting the glass of the present invention as described above, will be described as follows.

In this specification, unless otherwise stated, the respective contents and the total content of cationic components, will be represented by cation %, and the respective contents and the total content of anionic components, will be represented by anion %.

$P^{5+}$ is a main component (glass-forming oxide) to form glass, and it is an essential component to increase cutting efficiency in the near infrared region. If the content of $P^{5+}$ is less than 30%, its effect cannot be obtained sufficiently, and if it exceeds 50%, the glass becomes unstable, and the weather resistance will be lowered, such being undesirable. It is preferably from 30 to 48%, more preferably from 32 to 48%, further preferably from 34 to 48%.

$Al^{3+}$ is a main component (glass-forming oxide) to form glass, and it is an essential component for e.g. increasing weather resistance. If the content of $Al^{3+}$ is less than 5%, its effect cannot be obtained sufficiently, and if it exceeds 20%, the glass becomes unstable, and cutting efficiency in the near infrared region will be lowered, such being undesirable. It is preferably from 6 to 18%, more preferably from 7 to 15%. Here, as a raw material for $Al^{3+}$, it is undesirable to use $Al_2O_3$ or $Al(PO_3)_3$, from the viewpoint of an increase of the melting temperature or formation of non-meltable substances, or from such a viewpoint that the amount of $F^-$ to be charged will be decreased, whereby the glass tends to be unstable, and it is preferred to use $AlF_3$.

$R^+$ (wherein $R^+$ represents the total amount of alkali metal ions of $Li^+$, $Na^+$ and $K^+$ to be contained) is the essential component to lower the melting temperature of the glass, to lower the liquidus temperature of the glass, and to stabilize the glass. If $R^+$ is less than 20%, its effects cannot be obtained sufficiently, and if it exceeds 40%, the glass becomes unstable, such being undesirable. It is preferably from 20 to 38%, more preferably from 22 to 38%, further preferably from 24 to 38%. Here, $R^+$ represents the total amount of $Li^+$, $Na^+$ and $K^+$ to be contained, i.e. $Li^{++}$ $Na^{++}$ $K^+$. Further, at least either one of $Li^+$, $Na^+$ and $K^+$ is contained.

$Li^+$ is a component to lower the melting temperature of the glass, to lower the liquidus temperature of the glass, or to stabilize the glass, and is preferably contained in an amount of from 5 to 40%. If the content of $Li^+$ is less than 5%, its effects cannot be obtained sufficiently, and if it exceeds 40%, the glass becomes unstable such being undesirable. It is more preferably from 8 to 38%, further preferably from 10 to 35%.

$Na^+$ is a component to lower the melting temperature of the glass, to lower the liquidus temperature of the glass, or to stabilize the glass, and is preferably contained in an amount of from 5 to 40%. If the content of $Na^+$ is less than 5%, its effects cannot be obtained sufficiently, and if it exceeds 40%, the glass becomes unstable such being undesirable. It is more preferably from 5 to 35%, further preferably from 5 to 30%.

$K^+$ is a component to lower the melting temperature of the glass, and to lower the liquidus temperature of the glass, and is preferably contained in an amount of from 0.1 to 30%. If the content of $K^+$ is less than 0.1%, its effects cannot be obtained sufficiently, and if it exceeds 30%, the glass becomes unstable such being undesirable. It is more preferably from 0.5 to 25%, further preferably from 0.5 to 20%.

$R'^{2+}$ (wherein $R'^{2+}$ represents the total amount of alkaline earth metal ions of $Mg^{2+}$, $Ca^{2+}$, $Sr^{2+}$, $Ba^{2+}$ and $Zn^{2+}$ to be contained) is the essential component to lower the melting temperature of the glass, to lower the liquidus temperature of the glass, to stabilize the glass, and to increase the strength of the glass. If $R'^{2+}$ is less than 5%, its effects cannot be obtained sufficiently, and if it exceeds 30%, the glass becomes unstable, cutting efficiency in the near-infrared region tends to be lowered, and the strength of the glass tends to decrease, such being undesirable. It is preferably from 5 to 28%, more preferably from 5 to 25%, further preferably from 5 to 20%, most preferably from 5 to less than 12%. Further, at least either one of $Mg^{2+}$, $Ca^{2+}$, $Sr^{2+}$, $Ba^{2+}$ and $Zn^{2+}$, is contained.

$Mg^{2+}$ is not an essential component, but is a component to lower the melting temperature of the glass, to lower the liquidus temperature of the glass, to stabilize the glass, and to increase the strength of glass, and may be contained in a range of from 1 to 30%. In a case where $Mg^{2+}$ is contained, if its content is less than 1%, its effects cannot be obtained sufficiently, and if its content exceeds 30%, the glass becomes unstable, and the melting temperature of the glass rises, such being undesirable. It is preferably from 1 to 25%, more preferably from 1 to 20%.

$Ca^{2+}$ is not an essential component, but a component to lower the melting temperature of the glass, to lower the liquidus temperature of the glass, to stabilize the glass, and to increase the strength of the glass, and may be contained in a range of from 1 to 30%. In a case where $Ca^{2+}$ is contained, if its content is less than 1%, its effects cannot be obtained sufficiently, and if its content exceeds 30%, the glass becomes unstable and devitrification resistance deteriorates, such being undesirable. It is preferably from 1 to 25%, more preferably from 1 to 20%.

$Sr^{2+}$ is not an essential component, but is a component to lower the melting temperature of the glass, to lower the liquidus temperature of the glass, and to stabilize the glass, and may be contained in a range of from 1 to 30%. In a case where $Sr^{2+}$ is contained, if its content is less than 1%, its effects cannot be obtained sufficiently, and if t is content exceeds 30%, the glass becomes unstable, devitrification resistance deteriorates, and the strength of the glass decreases, such being undesirable. It is preferably from 1 to 25%, more preferably from 1 to 20%.

$Ba^{2+}$ is not an essential component, but is a component to lower the melting temperature of the glass, to lower the liquidus temperature of the glass, and to stabilize the glass, and may be contained in a range of from 1 to 30%. In a case where $Ba^{2+}$ is contained, if its content is less than 1%, its effects cannot be obtained sufficiently, and if t is content exceeds 30%, the glass becomes unstable, devitrification resistance deteriorates, and the strength of the glass decreases, such being undesirable. It is preferably from 1 to 25%, more preferably from 1 to 20%.

$Zn^{2+}$ is not an essential component, but is a component to lower the melting temperature of the glass, to lower the liquidus temperature of the glass and to increase the chemical durability of the glass, and may be contained in a range of from 1 to 30%. In a case where $Zn^{2+}$ is contained, if its content is less than 1%, its effects cannot be obtained sufficiently, and if its content exceeds 30%, the glass becomes unstable, devitrification resistance deteriorates, and the melting property of the glass deteriorates, such being undesirable. It is preferably from 1 to 25%, more preferably from 1 to 20%.

$Sb^{3+}$ is not an essential component, but has a higher redox potential than $Cu^{2+}$, and has the same effects as $Ce^{4+}$. It is effective to increase the transmittance in the visible region by increasing oxidation properties of the glass and suppressing the concentration increase of $Cu^+$ ions, but if the content of $Sb^{3+}$ exceeds 1%, the stability of the glass decreases, such being undesirable. It is preferably from 0 to 1%, more preferably from 0.01 to 0.8%. It is further preferably from 0.05 to 0.5%, most preferably from 0.1 to 0.3%.

$Fe^{3+}$ which is usually included as an impurity in the glass, has a lower redox potential than $Cu^{2+}$, whereby $Cu^{2+}$ tends to be easily reduced. Like $Fe^{3+}$, if a component having a redox potential lower than $Cu^{2+}$ coexists, $Cu^+$ is likely to be formed, thus leading to a decrease in transmittance, such being undesirable. Such components may, for example, be, in addition to $Fe^{3+}$, $Cr^{3+}$, $Ni^{2+}$, $Co^{2+}$, $Mo^{3+}$, $Mn^{2+}$, etc., and it is preferred to avoid their contamination into glass as much as possible. If such components are contained, the content is specifically less than 0.05%, preferably less than 0.03%, more preferably less than 0.02%.

$O^{2-}$ is an essential component to stabilize the glass, to increase the transmittance in the visible region, to increase mechanical properties such as strength, hardness and elastic modulus, or to reduce the transmittance of ultraviolet rays. If the content of $O^{2-}$ is less than 30%, its effects cannot be obtained sufficiently, and if it exceeds 90%, the glass becomes unstable, the weather resistance tends to be lowered, etc., such being undesirable. It is preferably from 30 to 80%, more preferably from 30 to 75%.

$F^-$ is an essential component to stabilize the glass, to improve weather resistance, etc. If the content of $F^-$ is less than 10%, its effects cannot be obtained sufficiently, and if it exceeds 70%, the transmittance in the visible region decreases, mechanical properties such as strength, hardness and elastic modulus, tend to decrease, and volatility tends to be high whereby striae tend to increase, such being undesirable. It is preferably from 10 to 50%, more preferably from 15 to 40%.

The glass of the present invention is preferably substantially free from PbO, $As_2O_3$, $V_2O_5$, $LaF_3$, $YF_3$, $YbF_3$ and $GdF_3$. PbO is a component to lower the viscosity of the glass, and to improve the production efficiency. Further, $As_2O_3$ is a component to act as an excellent fining agent capable of generating a fining gas in a wide temperature range. However, PbO and $As_2O_3$ are environmental load substances, and it is desirable not to contain them as much as possible. $V_2O_5$ has an absorption in the visible region, and therefore, it is desirable not to contain it as much as possible in a near-infrared cutoff filter glass for solid-state imaging element which is required to have a high visible region transmittance. $LaF_3$, $YF_3$, $YbF_3$ and $GdF_3$ are components to stabilize the glass, but their raw materials are relatively expensive, thus leading to an increase in cost, and therefore, it is desirable not to contain them as much as possible. Here, substantially free is meant that no use is intended as a starting material, and unavoidable impurities mixed from the raw material or production process shall be regarded as not contained.

To the glass of the present invention, a nitrate compound or sulfate compound having cations to form the glass may be added as an oxidizing agent or a refining agent. The oxidizing agent has an effect to suppress decrease in transmittance by suppressing formation of $Cu^+$ ions. The addition amount of the nitrate compound or sulfate compound is preferably from 0.5 to 10 mass % by outer percentage to the raw material mixture. If the addition amount is less than 0.5 mass %, there will be no effect to improve the transmittance, and if it exceeds 10 mass %, formation of glass tends to be difficult. It is more preferably from 1 to 8 mass %, further preferably from 3 to 6 mass %. The nitrate compound may, for example, be $Al(NO_3)_3$, $LiNO_3$, $NaNO_3$, $KNO_3$, $Mg(NO_3)_2$, $Ca(NO_3)_2$, $Sr(NO_3)_2$, $Ba(NO_3)_2$, $Zn(NO_3)_2$, $Cu(NO_3)_2$, etc. The sulfate compound may, for example, be $Al_2(SO_4)_3 \cdot 16H_2O$, $Li_2SO_4$, $Na_2SO_4$, $K_2SO_4$, $MgSO_4$, $CaSO_4$, $SrSO_4$, $BaSO_4$, $ZnSO_4$, $CuSO_4$, etc.

Here, the near-infrared cutoff filter glass of the present invention is capable of obtaining good spectral characteristics even in a state where the thickness of the glass is thin, in order to cope with miniaturization and thinning of an imaging device or its mounting device. The thickness of the glass is preferably less than 1 mm, more preferably less than 0.8 mm, further preferably less than 0.6 mm, most preferably less than 0.4 mm. Here, the lower limit for the thickness of the glass is not particularly limited, but, in consideration of the strength hardly susceptible to breakage during the production of the glass, or during transportation to be incorporated in an imaging apparatus, it is preferably at least 0.05 mm, more preferably at least 0.07 mm, further preferably at least 0.1 mm.

The glass of the present invention may have an optical thin film such as an anti-reflection film, or an infrared cutoff film or ultraviolet and infrared cutoff film, provided on the glass surface. Such an optical thin film may be consisted of a single layer film or a multi-layer film and may be formed by a known method such as a vapor deposition method or a sputtering method.

The near-infrared cutoff filter glass of the present invention may be prepared as follows.

First, raw materials are weighed and mixed so that the obtainable glass would be in the above-mentioned composition range. This raw material mixture is accommodated in a platinum crucible and heat-melted at a temperature of from 700 to 1,000° C. in an electric furnace. After thorough stirring and refining, the melt is cast in a mold and annealed, followed by cutting and polishing the annealed product to form into a flat plate with a predetermined thickness. In the above production method, the glass during melting is preferably set to be at most 950° C. If the glass temperature during melting exceeds 950° C., the equilibrium state in redox of Cu ions tends to be biased towards the $Cu^+$ side more than the coexistence effect of $Ce^{4+}$, whereby the transmittance characteristics are likely to be deteriorated, and volatilization of fluorine tends to be promoted, whereby the glass tends to become unstable. The above temperature is more preferably at most 900° C., most preferably at most 850° C. Further, if the above temperature is too low, crystallization may occur during melting, or it takes time for melting, it is preferably at least 700° C., more preferably at least 750° C.

EXAMPLES

Examples and Comparative Examples of the present invention are shown in Tables 1 to 2. Ex. 1 to 11 are Examples of the present invention, and Ex. 12 to 16 are Comparative Examples of the present invention.

For such glass, raw materials were weighed and mixed so as to bring the composition (cation %, anion %) to be as shown in Table 1 and Table 2, put in a platinum crucible having an inner volume of about 400 cc, and melted, refined and stirred at a temperature of from 800 to 920° C. for two hours, followed by casting in a rectangular mold of 50 mm in length×50 mm in width×20 mm in height preheated to from about 300 to 500° C., and then by annealing at a rate of about 1° C./min to obtain a sample.

As the raw materials for the respective components of the glass, the following ones were used.

As $Al^{3+}$, $AlF_3$, $Al(PO_3)_3$ and/or $Al_2O_3$.
As $P^{5+}$, $H_3PO_4$ and/or $Al(PO_3)_3$.
As $Al^{3+}$, $AlF_3$, $Al(PO_3)_3$ and/or $Al_2O_3$.
As $Li^+$, LiF, $LiNO_3$ and/or $LiPO_3$.
As $Mg^{2+}$, $MgF_2$ and/or MgO.
As $Sr^{2+}$, $SrF_2$ and/or $SrCO_3$.

As $Ba^{2+}$, $BaF_2$ and/or $BaCO_3$.
As $Na^+$, $K^+$, $Ca^{2+}$ and $Zn^{2+}$, the respective fluorides.
As $Ce^{4+}$, $CeO_2$.
As $Cu^{2+}$, CuO.

In Tables 1 and 2, $R^+$ represents the total content of alkali metal ions of $Li^+$, $Na^+$ and $K^+$ to be contained, and $R^{2+}$ represents the total content of alkaline earth metal ions of $Mg^{2+}$, $Ca^{2+}$, $Sr^{2+}$, $Ba^{2+}$ and $Zn^{2+}$ to be contained.

TABLE 1

| Cation %, anion % | Ex. 1 | Ex. 2 | Ex. 3 | Ex. 4 | Ex. 5 | Ex. 6 | Ex. 7 | Ex. 8 |
|---|---|---|---|---|---|---|---|---|
| $P^{5+}$ | 37.93 | 38.44 | 39.12 | 39.48 | 39.61 | 39.77 | 39.98 | 39.00 |
| $Al^{3+}$ | 10.92 | 11.08 | 11.27 | 11.38 | 11.41 | 11.46 | 11.52 | 11.20 |
| $Li^+$ | 21.17 | 21.47 | 21.85 | 22.05 | 22.12 | 22.22 | 22.33 | 21.80 |
| $Na^+$ | 11.57 | 11.74 | 11.94 | 12.05 | 12.09 | 12.14 | 12.21 | 11.90 |
| $R^+$ | 32.75 | 33.21 | 33.79 | 34.11 | 34.21 | 34.36 | 34.54 | 33.70 |
| $Mg^{2+}$ | 0.00 | 0.00 | 0.00 | 0.00 | 0.00 | 0.00 | 0.00 | 0.00 |
| $Ca^{2+}$ | 5.90 | 5.98 | 6.09 | 6.15 | 6.17 | 6.19 | 6.22 | 6.10 |
| $Sr^{2+}$ | 1.88 | 1.91 | 1.94 | 1.96 | 1.96 | 1.97 | 1.98 | 1.90 |
| $Ba^{2+}$ | 3.95 | 4.01 | 4.08 | 4.12 | 4.13 | 4.15 | 4.17 | 4.10 |
| $R^{2+}$ | 11.73 | 11.90 | 12.11 | 12.22 | 12.26 | 12.31 | 12.37 | 12.10 |
| $Ce^{4+}$ | 0.50 | 0.51 | 0.41 | 0.31 | 0.21 | 0.21 | 0.21 | 0.60 |
| $Cu^{2+}$ | 6.18 | 4.87 | 3.30 | 2.50 | 2.30 | 1.89 | 1.37 | 3.30 |
| Total | 100.00 | 100.00 | 100.00 | 100.00 | 100.00 | 100.00 | 100.00 | 99.90 |
| $O^{2-}$ | 54.00 | 54.96 | 53.99 | 53.75 | 53.68 | 53.56 | 53.42 | 54.00 |
| $F^-$ | 46.00 | 45.04 | 46.01 | 46.25 | 46.32 | 46.44 | 46.58 | 46.00 |
| $Cu^{2+}/Ce^{4+}$ | 12.4 | 9.6 | 8.0 | 8.0 | 11.0 | 9.0 | 6.5 | 5.5 |
| % T400 | 87.3 | 87.6 | 89.4 | 89.4 | 90.0 | 91.2 | 90.0 | 86.6 |
| Sample thickness (mm) | 0.23 | 0.32 | 0.30 | 0.60 | 0.50 | 0.61 | 1.32 | 0.30 |
| % T400 converted in t03 mm | 86.15 | 87.82 | 89.38 | 90.29 | 90.48 | 91.17 | 90.92 | 86.61 |
| Absorption coefficient (wavelength 400 nm) [mm-1] | 0.082 | 0.055 | 0.029 | 0.015 | 0.013 | 0.000 | 0.004 | 0.075 |
| Absorption coefficient (wavelength 800 nm) [mm-1] | 9.168 | 7.403 | 5.012 | 3.878 | 3.591 | 2.934 | 2.068 | 5.002 |
| Absorption coefficient (wavelength 400 nm)/ absorption coefficient (wavelength 800 nm) | 0.009 | 0.007 | 0.006 | 0.004 | 0.004 | 0.000 | 0.002 | 0.015 |
| Weather resistance | ○ | ○ | ○ | ○ | ○ | ○ | ○ | ○ |

TABLE 2

| Cation%, anion% | Ex. 9 | Ex. 10 | Ex. 11 | Ex. 12 | Ex. 13 | Ex. 14 | Ex. 15 | Ex. 16 |
|---|---|---|---|---|---|---|---|---|
| $P^{5+}$ | 42.90 | 43.00 | 44.10 | 43.10 | 43.30 | 44.30 | 43.96 | 43.8 |
| $Al^{3+}$ | 9.00 | 9.00 | 6.40 | 9.10 | 9.10 | 6.40 | 9.25 | 9.2 |
| $Li^+$ | 23.90 | 30.20 | 0.00 | 24.00 | 30.40 | 0.00 | 24.49 | 24.4 |
| $Na^+$ | 0.00 | 0.00 | 24.10 | 0.00 | 0.00 | 24.20 | 0.00 | 0.00 |
| $R^+$ | 23.90 | 30.20 | 24.10 | 24.00 | 30.40 | 24.20 | 24.49 | 24.40 |
| $Mg^{2+}$ | 3.20 | 0.00 | 11.60 | 3.30 | 0.00 | 11.70 | 3.33 | 3.3 |
| $Ca^{2+}$ | 4.40 | 4.40 | 4.00 | 4.40 | 4.50 | 4.00 | 4.52 | 4.5 |
| $Sr^{2+}$ | 5.50 | 2.50 | 3.00 | 5.50 | 2.50 | 3.00 | 5.62 | 5.6 |
| $Ba^{2+}$ | 5.70 | 5.70 | 3.90 | 5.70 | 5.80 | 3.90 | 5.84 | 5.8 |
| $R^{2+}$ | 18.80 | 12.60 | 22.50 | 18.90 | 12.80 | 22.60 | 19.31 | 19.20 |
| $Ce^{4+}$ | 0.50 | 0.60 | 0.30 | 0.00 | 0.00 | 0.00 | 1.23 | 1.6 |
| $Cu^{2+}$ | 4.90 | 4.50 | 2.60 | 5.00 | 4.50 | 2.60 | 1.77 | 1.8 |
| Total | 100.00 | 99.90 | 100.00 | 100.10 | 100.10 | 100.10 | 100.01 | 100.00 |
| $O^{2-}$ | 58.61 | 57.81 | 65.84 | 58.42 | 57.60 | 65.75 | 57.74 | 57.7 |
| $F^-$ | 41.39 | 42.19 | 34.16 | 41.58 | 42.40 | 34.25 | 42.26 | 42.3 |
| $Cu^{2+}/Ce^{4+}$ | 9.8 | 7.5 | 8.7 | — | — | — | 1.4 | 1.1 |

TABLE 2-continued

| Cation%, anion% | Ex. 9 | Ex. 10 | Ex. 11 | Ex. 12 | Ex. 13 | Ex. 14 | Ex. 15 | Ex. 16 |
|---|---|---|---|---|---|---|---|---|
| % T400 | 80.7 | 85.0 | 87.3 | 79.5 | 84.2 | 86.7 | 77.2 | 82.1 |
| Sample thickness (mm) | 0.23 | 0.32 | 0.30 | 0.23 | 0.32 | 0.30 | 0.30 | 0.30 |
| % T400 converted in t03 mm | 77.75 | 85.37 | 87.30 | 76.47 | 84.57 | 86.70 | 77.2 | 82.1 |
| Absorption coefficient (wavelength 400 nm) [mm-1] | 0.231 | 0.096 | 0.064 | 0.259 | 0.109 | 0.073 | 0.229 | 0.139 |
| Absorption coefficient (wavelength 800 nm) [mm-1] | 7.634 | 6.888 | 4.034 | 7.833 | 7.121 | 4.136 | 2.675 | 2.635 |
| Absorption coefficient (wavelength 400 nm)/ absorption coefficient (wavelength 800 nm) | 0.030 | 0.014 | 0.016 | 0.033 | 0.015 | 0.018 | 0.086 | 0.053 |
| Weather resistance | ○ | ○ | ○ | ○ | ○ | ○ | — | — |

With respect to the glass prepared as described above, $Cu^{2+}/Ce^{4+}$ was obtained, and with respect to the transmittance at a wavelength of 400 nm, the absorption coefficients (at a wavelength of 400 nm and a wavelength of 800 nm) and the weather resistance, evaluations were conducted by the following methods.

The transmittance was evaluated by using an ultraviolet-visible-near-infrared spectrophotometer (trade name: V-570, manufactured by JASCO Corporation). Specifically, a glass sample of 40 mm in length×30 mm in width having both sides optically polished to the sample thickness as shown in Tables, was prepared, and the measurement was conducted. In Tables 1 and 2, the transmittance at a wavelength of 400 nm in the thickness of each glass sample, is presented as "% T400", and the transmittance at a wavelength of 400 nm converted in a thickness 0.3 mm is presented as "% T400 converted in t0.3 mm".

The absorption coefficients were calculated by measuring the transmittances at a wavelength of 400 nm and a wavelength of 800 nm by using the above-mentioned ultraviolet-visible near-infrared spectrophotometer and excluding a reflection loss at the front and back surfaces. From the calculated values, a numerical value was obtained by dividing the absorption coefficient at a wavelength of 400 nm by the absorption coefficient at a wavelength of 800 nm.

For the weather resistance, by using a thermo-hygrostat (trade name: SH-221, manufactured by Espec Corp.), an optically polished glass sample was held in a constant-temperature constant-humidity bath at 65° C. under a relative humidity of 93% for 500 hours, whereupon the burnt state of the glass surface was visually observed, and one where no burning was observed, was judged to be ○ (no problem in weather resistance). Here, "-" in the column for the weather resistance of Ex. 15 and 16 in Table 2, indicates that no test was conducted.

From Tables 1 and 2, it is evident that in Examples of the present invention, glass having a high transmittance at a wavelength 400 nm in a thickness (t) of 0.3 mm was obtained. When Ex. 6 as Example of the present invention is compared with Ex. 15 and 16 as Comparative Examples wherein the content of $Cu^{2+}$ is similar, the transmittance at a wavelength of 400 nm in a thickness (t) of 0.3 mm is higher in Ex. 6. Further, Ex. 12 to 14 as Comparative Examples are ones having $Ce^{4+}$ excluded from Ex. 9 to 11, and despite the amount of $Cu^{2+}$ being substantially the same, the transmittance at a wavelength of 400 nm in a thickness (t) of 0.3 mm is higher in Ex. 9 to 11. This is due to the fact that $Cu^{2+}/Ce^{4+}$ in Comparative Examples is outside the range of the present invention.

INDUSTRIAL APPLICABILITY

According to the present invention, even when the content of Cu component is large along with thinning of a near infrared cutoff filter glass, it is possible to obtain glass with optical properties such that the transmittance of light in the visible region is high, and the transmittance of light in the near infrared region is low, and thus, the glass is very useful for application to a near-infrared cutoff filter for an imaging device to be smaller and thinner.

This application is a continuation of PCT Application No. PCT/JP2016/057621, filed on Mar. 10, 2016, which is based upon and claims the benefit of priority from Japanese Patent Application No. 2015-060760 filed on Mar. 24, 2015. The contents of those applications are incorporated herein by reference in their entireties.

What is claimed is:
1. A near infrared cutoff filter glass comprising, wherein by cation %,
  $P^{5+}$: from 30 to 50%,
  $Al^{3+}$: from 5 to 20%,
  $R^+$: from 20 to 40% (wherein $R^+$ is the total amount of $Li^+$, $Na^+$ and $K^+$),
  $R'^{2+}$: from 5 to less than 12% (wherein $R'^{2+}$ is the total amount of $Mg^{2+}$, $Ca^{2+}$, $Sr^{2+}$, $Ba^{2+}$ and $Zn^{2+}$),
  $Cu^{2+}$: from 0.1 to 15%,

$Sb^{3+}$: from 0 to 1%, and
$Ce^{4+}$: from 0.01 to 4%,
and as represented by anion %,
$O^{2-}$: from 30 to 90% and
$F^-$: from 10 to 70%; and
the ratio of $Cu^{2+}$ to $Ce^{4+}$ ($Cu^{2+}/Ce^{4+}$) is from 3.5 to 15.

2. The near infrared cutoff filter glass according to claim 1, wherein by cation %, from 0.01 to 3% of $Ce^{4+}$ is contained.

3. The near infrared cutoff filter glass according to claim 1, wherein the numerical value obtained by dividing the absorption coefficient at a wavelength of 400 nm by the absorption coefficient at a wavelength of 800 nm is in a range of from 0.00001 to 0.03.

4. The near infrared cutoff filter glass according to claim 1, wherein $Cu^{2+}$ is from 0.2 to 10% by cation %.

5. The near infrared cutoff filter glass according to claim 1, wherein the ratio of $Cu^{2+}$ to $Ce^{4+}$ ($Cu^{2+}/Ce^{4+}$) is from 5 to 14.

6. The near infrared cutoff filter glass according to claim 1, wherein the ratio of $Cu^{2+}$ to $Ce^{4+}$ ($Cu^{2+}/Ce^{4+}$) is from 6 to 14.

7. The near infrared cutoff filter glass according to claim 1, wherein $Ce^{4+}$ is from 0.05 to 3% by cation %.

8. The near infrared cutoff filter glass according to claim 1, wherein $P^{5+}$ is from 32 to 48% by cation %.

9. The near infrared cutoff filter glass according to claim 1, wherein $Al^{3+}$ is from 6 to 18% by cation %.

10. The near infrared cutoff filter glass according to claim 1, wherein $R^+$ is from 22 to 38% by cation % (wherein $R^+$ is the total amount of $Li^+$, $Na^+$ and $K^+$).

11. The near infrared cutoff filter glass according to claim 1, wherein $R^+$ is at least $Li^+$ and $Li^+$ is from 5 to 40% by cation %.

12. The near infrared cutoff filter glass according to claim 1, wherein $R^+$ is at least $Na^+$ and $Na^+$ is from 5 to 40% by cation %.

13. The near infrared cutoff filter glass according to claim 1, wherein $R^+$ is at least $K^+$ and $K^+$ is from 0.1 to 30% by cation %.

14. The near infrared cutoff filter glass according to claim 1, wherein the individual amounts of $Mg^{2+}$, $Ca^{2+}$, $Sr^{2+}$, $Ba^{2+}$, and/or $Zn^{2+}$ are from 1 to less than 12% by cation % when present.

15. The near infrared cutoff filter glass according to claim 1, wherein $Sb^{3+}$ is from 0.01 to 0.8% by cation %.

16. The near infrared cutoff filter glass according to claim 1, further comprising $Fe^{3+}$ in an amount of less than 0.05% by cation %.

17. The near infrared cutoff filter glass according to claim 1, an additional cation selected from the ground consisting of $Cr^{3+}$, $Ni^{2+}$, $Co^{2+}$, $Mo^{3+}$, $Mn^{2+}$, and mixtures thereof, wherein said additional cation is in an amount of less than 0.05% by cation %.

18. The near infrared cutoff filter glass according to claim 1, wherein $O^{2-}$ is from 30 to 80% by anion %.

19. The near infrared cutoff filter glass according to claim 1, wherein $F^-$ is from 10 to 50% by anion %.

* * * * *